MAGNETIC DRUM PLAYBACK CIRCUITRY

Filed Feb. 23, 1956 2 Sheets-Sheet 1

INVENTOR
William H. Walters
BY Earl Beust
Louis A. Kline
John T. Matlago
HIS ATTORNEYS

MAGNETIC DRUM PLAYBACK CIRCUITRY

Filed Feb. 23, 1956 2 Sheets-Sheet 2

INVENTOR
William H. Walters
BY Carl Beust
Louis A Kline
John J. Matlago
HIS ATTORNEYS

United States Patent Office 2,935,736

Patented May 3, 1960

2,935,736

MAGNETIC DRUM PLAYBACK CIRCUITRY

William H. Walters, Culver City, Calif., assignor to The National Cash Register Company, Dayton, Ohio, a corporation of Maryland Application February 23, 1956, Serial No. 567,385

9 Claims. (Cl. 340—174)

This invention relates to circuits employed for shaping and gating signals produced as a result of sensing a binary flux pattern on a moving media and, more particularly, to a circuit which accomplishes these functions without introducing distortions which affect the reliability of other circuits controlled thereby.

The circuitry associated with the playback heads which read information recorded as binary flux patterns within discrete areas of the sensitized surface of the rotating drum memory of a computer should operate to amplify the induced signal, discriminate against noise voltages, and allow for gating of a particular playback head by, for instance, the channel select function generated in the computer. One arrangement of playback circuit used in the prior art employs a magnetic head comprising a core of soft iron or the like and coils wound thereon, one coil for reading signals from the drum and a second coil for recording signals on the drum. The playback coil voltage is applied to the control grid of a pentode preamplifying tube, the suppressor grid of which is conveniently employed to carry the channel select function received from the channel select matrix of the computer. Thus this tube functions as an "and" gate as well as an amplifier, i.e., a coincidence of proper voltages on the suppressor grid (channel select function) and the control grid (playback signal) is required to cause the tube to pass signal current. A similar preamplifier stage is employed to cooperate with each of a plurality of other heads among which selection is made by the channel select function. The terminals of all preamplifier stages from which outputs are taken are connected to a common junction. The selected signal output appears at the common junction and is then further amplified, shaped to a square waveform, and clamped at the levels +100 v. and +125 v. to conform with the logical amplitude level and form required by computer operations. The square waveform signal is then differentiated and limited to form negative pulses which are caused to trigger the memory flip-flop. Thus one direction change in flux pattern in the channel causes the memory flip-flop to be triggered into a true state and an opposite direction change in flux pattern in the channel causes the memory flip-flop to be triggered into a false state. Thus the outputs of the memory flip-flop are controlled to generate electrical signals which correspond to the flux pattern on the drum.

In accordance with the above resume of circuitry, well understood in the prior art, it is apparent that channel selection is accomplished when the signal is at a low level of amplitude, i.e., at the preamplifier stage, and it is not unusual for the magnitude of the signal induced in the playback coil to be of the order of approximately 250 millivolts. As a result, transient impulses, originating as will be described, may be of amplitude sufficient to mask or override the desired signal to the extent that spurious triggering of the memory flip-flop occurs. Thus, the output of the memory flip-flop may no longer represent the signal as originally recorded on the drum.

These aforementioned transient impulses have the greatest detrimental effect on especially that portion of the system circuitry which provides coupling between successive amplification stages for the alternating voltage of the signal.

To exemplify, consider the channel select function as it appears at the suppressor grid of the preamplifier stage. It is, of course, highly desirable that the channel select function, i.e., the selective signal output from the channel select matrix defining the particular channel with which communication is to occur, be at the same level of voltage regardless of which channel is selected. However, as is well known, the components of the channel select matrix, particularly the crystal diodes thereof, are not identical in electrical characteristics. In addition, the computer channel select register, which serves as input to the matrix, is comprised in the main of a plurality of flip-flops which also possess slightly different characteristics. Thus it is not unusual for the channel select function to be at voltage levels differing by as much as 5 volts D.C. from a nominal value of +125 v. for the various channel selections. If the gain of the preamplifier stage is tenfold, for a signal input of 0.25 volt, it is seen that the channel switching transient may produce a D.C. voltage level shift commensurate in amplitude to the signal. The preamplifier stage acts to cause the signal voltage to ride as modulation on the level change in D.C. voltage caused by channel switching. When this composite signal is A.C. coupled to succeeding amplifier stages, differentiation by coupling networks produces a voltage pulse on the grid of the first tube for each change in D.C. voltage level. Of course, the change accumulated in the coupling network due to the voltage pulse dissipates in a period of time controlled by the time constant of the network. However, until full dissipation occurs, the signal cannot be shaped for triggering the memory flip-flop and, even under optimum coupling design, the delay required is about four word periods of computer operation. It is for this reason mainly that the computer is inhibited from reading a register for a fixed time (for example, four word periods) after selection of the channel in which the register is located.

In addition, it has been noted that all preamplifier stages associated with the memory heads also cannot be conveniently designed for identical characteristics, and that it is not feasible to provide clamping means for the outputs therefrom, which are still rather low-level despite the stage amplification. This consideration thereby forms the basis of a D.C. voltage level shift appearing at the aforementioned common junction.

It has been observed that the record coil may be wound on the same core as the playback coil. The resulting close proximity of the coils introduces a further objectionable effect in the operation of the playback circuitry described above. This effect, designated as "paralysis," refers to an inoperative condition of the preamplifier stage due to signals existing in the record coil being induced in the playback coil as well as in the sensitized surface of the drum. The effect is a form of "crosstalk" commonly considered detrimental in other communication systems. This paralysis acts to charge the input capacitor of the preamplifier stage to a voltage far exceeding that of which a playback signal is capable. While the charge exists, a playback signal cannot be sensed. Thus a delay on the order of four word periods, similar to the delay required as a result of a possible D.C. level transient, has been found necessary if it is desired to read a signal soon after recording a signal.

It is thus an object of the present invention to reduce the aforementioned delay by providing means for avoiding D.C. voltage level changes caused by coupling networks acting on channel select switching transients and by variations in preamplifier tube characteristics.

It is an additional object of this invention to provide playback circuitry not subject to the paralysis hereinbefore described.

Another object of this invention is to provide circuitry associated with each of a plurality of heads cooperating with a memory drum whereby selective switching of heads may be accomplished at a relatively high level of signal voltage on the order of the level of voltage at which logical propositions in the computer are effective.

It is a more general object of this invention to provide noise-discriminating circuitry for amplifying and shaping the signal output of a computer's memory heads so that the resultant signal may be employed to reliably trigger the memory flip-flop.

Briefly, the circuitry of the present invention is employed for the playback output of each head to be switched for providing input to the memory flip-flop, and comprises a signal amplifying arrangement and phase inverter means coupled to a clamping circuit. The amplifier stage serves to increase the voltage level of the signal and the phase inverter serves to produce additional outputs 180° out of phase with each signal corresponding to a change in magnetic flux pattern on the drum. The clamping circuit serves to remove negative-going excursions of the signal and is provided with means to also eliminate spurious positive-going signals of amplitude less than the signal. The output of the clamping circuit is a positive-going pulse corresponding to each change in direction of the flux pattern on the drum. The clamping circuit feeds two logical "and" circuits, the outputs of which are made effective by the channel select function as selected by the channel select matrix of the computer if the particular channel being considered is to be read. The gated outputs of the "and" circuits are arranged as inputs to a logical "or" circuit, the other inputs of which originate in similar "and" circuits associated with the playback output of each of the other heads sensing information in a memory channel. The selected outputs of the "or" circuit may then be inverted, if necessary, differentiated, and employed as inputs to the memory flip-flop.

The objects and many of the attendant advantages of this invention will become readily apparent as the same becomes better understood by reference to the preferred embodiment detailed in the following description and accompanying drawings in which.

Figure 1:
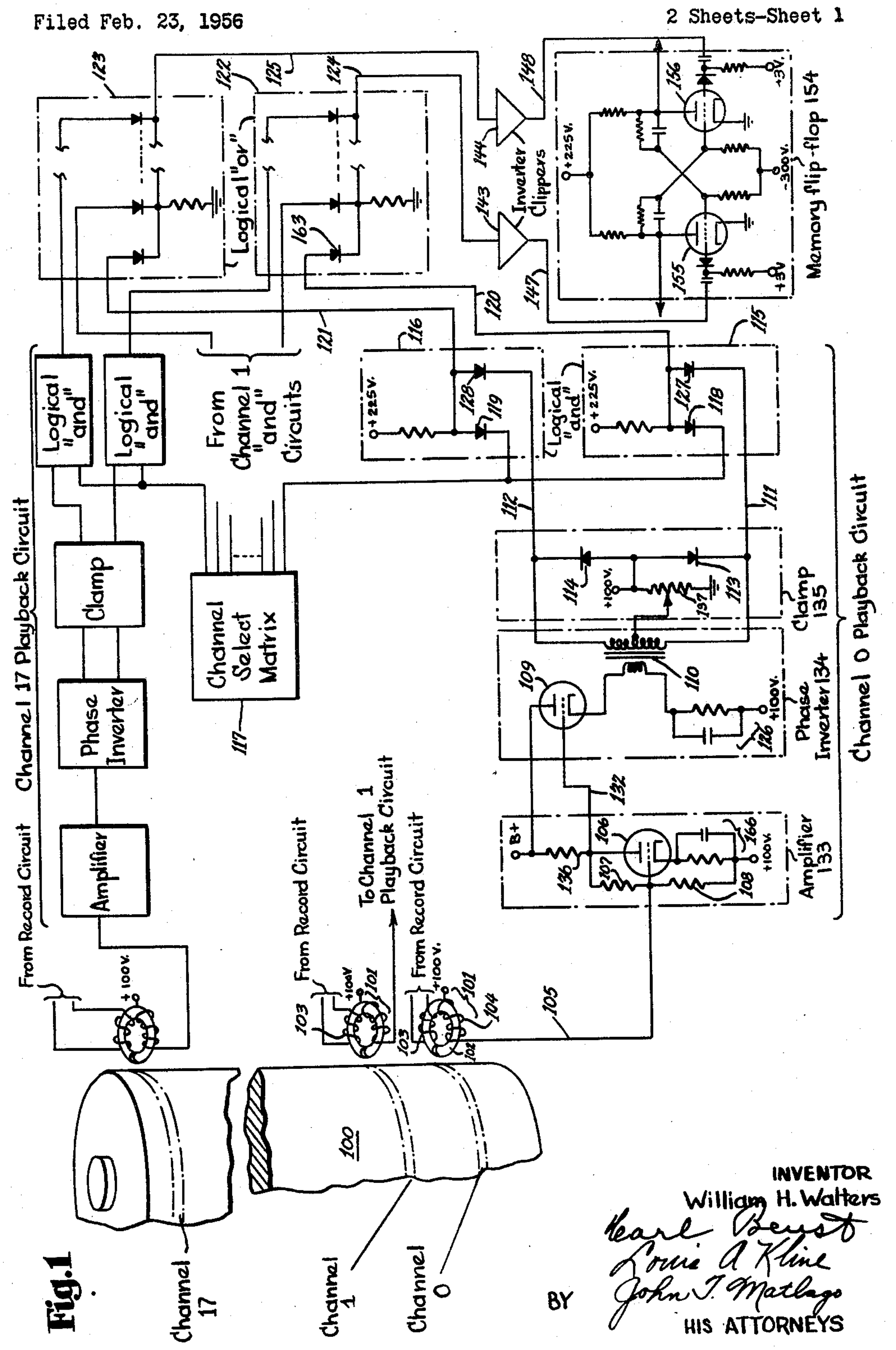
Fig. 1 shows the circuit adapted to amplify, shape, and appropriately gate the signal sensed by the magnetic heads associated with the memory channels on the rotating drum of a computer for triggering the memory flip-flop.

Referring now to Fig. 1, here is schematically shown a section of memory drum 100 of a computer on which provision is made for 18 information channels, designated as channel 0 through channel 17. In the following discussion, it will, of course, be understood that similar circuitry is associated with each of the channels, although specific reference is to channel 0.

Positioned adjacent the channel so as to permit recording of signals thereon or reading signals therefrom is magnetic head 101 which comprises two coils wound on a split core 102 of ferrous material or the like. Record coil 103 is connected to the record circuitry of the computer (not shown) and functions to magnetize the sensitized surface of drum 100 along channel 0, in accordance with the information to be stored. Playback coil 104 operates to sense information recorded on channel 0 and is connected at one end thereof to a source of positive voltage +100 v., and at the other end to line 105 which connects in turn to the control grid of amplifier tube 106 in amplifier stage 133. The cathode of tube 106 is returned to the +100 v. source by means of network 166. The output of tube 106 is taken at the anode and appears across the voltage divider comprising resistors 107 and 108 which are proportioned such that a small portion of a signal is inversely fed back to the control grid for purposes of stabilizing the stage gain. The anode of tube 106 is connected to a source of high B+ voltage through resistor 136 and is also directly coupled by line 132 to the control grid of cathode follower tube 109 of phase inverter stage 134. Tube 109 serves mainly as an impedance matching device for minimum attenuation of a signal to be conveyed from tube 106 to subsequent circuitry. The anode of tube 109 is connected directly to the B+ source and output therefrom is taken from the cathode by means of transformer 110, the low impedance primary winding of which is serially connected in the cathode circuit. Resistor-capacitor network 126 in the cathode circuit provides a connection to +100 v. bias and a stabilized D.C. return path for current through tube 109. Transformer 110 possesses a wide-band frequency characteristic in order that signals of pulse form may be passed to clamp 135 without appreciable distortion. The high-impedance secondary winding of transformer 110 is center-tapped, the tap being connected to the adjustable contact of potentiometer 137 and the ends being connected to lines 111 and 112. The terminals of potentiometer 137 are in turn connected to the +100 v. source and ground, thereby providing an adjustable reference voltage level at the center-tap for excursions of signal. With reference to approximate voltage gain, the following have been found suitable: 10 in amplifier stage 133, 0.9 in cathode-follower tube 109, and 10 from the primary to each half of the secondary of transformer 110, for an overall voltage gain of about 90. Thus a 0.25 volt signal pulse originating in playback coil 104 will have been amplified to approximately 22.5 volts prior to clamping.

Lines 111 and 112 connect to the cathode-ends of diodes 113 and 114 of clamp 135, respectively, the anode-ends of which are connected together and thence to the +100 v. source, thus establishing a reference voltage level for these lines. Lines 111 and 112 also respectively connect to the cathode-ends of diodes 127 and 128, thereby providing inputs to logical "and" circuits 115 and 116. The other input to "and" circuits 115 and 116 provides for connecting the cathode-ends of diodes 118 and 119 to one output of channel select matrix 117. Matrix 117 comprises the channel select function and provides other outputs to the respective playback "and" circuits associated with the other channels of the drum. Thus the cathode-ends of diodes 118 and 119 are high when playback is to be from channel 0. The outputs from "and" circuits 115 and 116 appear on lines 120 and 121, respectively, and are transmitted to logical "or" circuits 122 and 123. It is seen that the signals from all channel playback circuits are severally connected to the anode-ends of diodes, such as diode 163, for the signal on line 120 of the channel 0 playback circuitry. As shown, "or" circuits 122 and 123 are each fed with respective signals from a respective one of the pair of playback circuits provided for each channel, and each input is provided with an isolating diode therein, such as diode 163 in "or" circuit 122. The outputs of "or" circuits 122 and 123 appear on lines 124 and 125, respectively, which, in this embodiment, connect to inverter-clippers 143 and 144 preferably comprising conventional stages of voltage amplification. The outputs from inverters 143 and 144 are taken on lines 147 and 148, respectively, which connect to the two inputs to memory flip-flop 154.

Memory flip-flop 154 is of the Eccles-Jordan type, well known in the art, and thus need not be discussed further than to point out that, in operation, control grid networks therein differentiate and limit the leading and trailing edges of a square pulse applied thereto to form negative-going peaked pulses of triggering magnitude corresponding only to the leading edges. Respective outputs are taken from the anodes of the tubes and transmitted to other computer circuitry (not shown).

The circuitry provided for the other memory channels in the present embodiment is similar to that shown and described in detail for channel 0, and in block form for channel 17.

Figure 2:
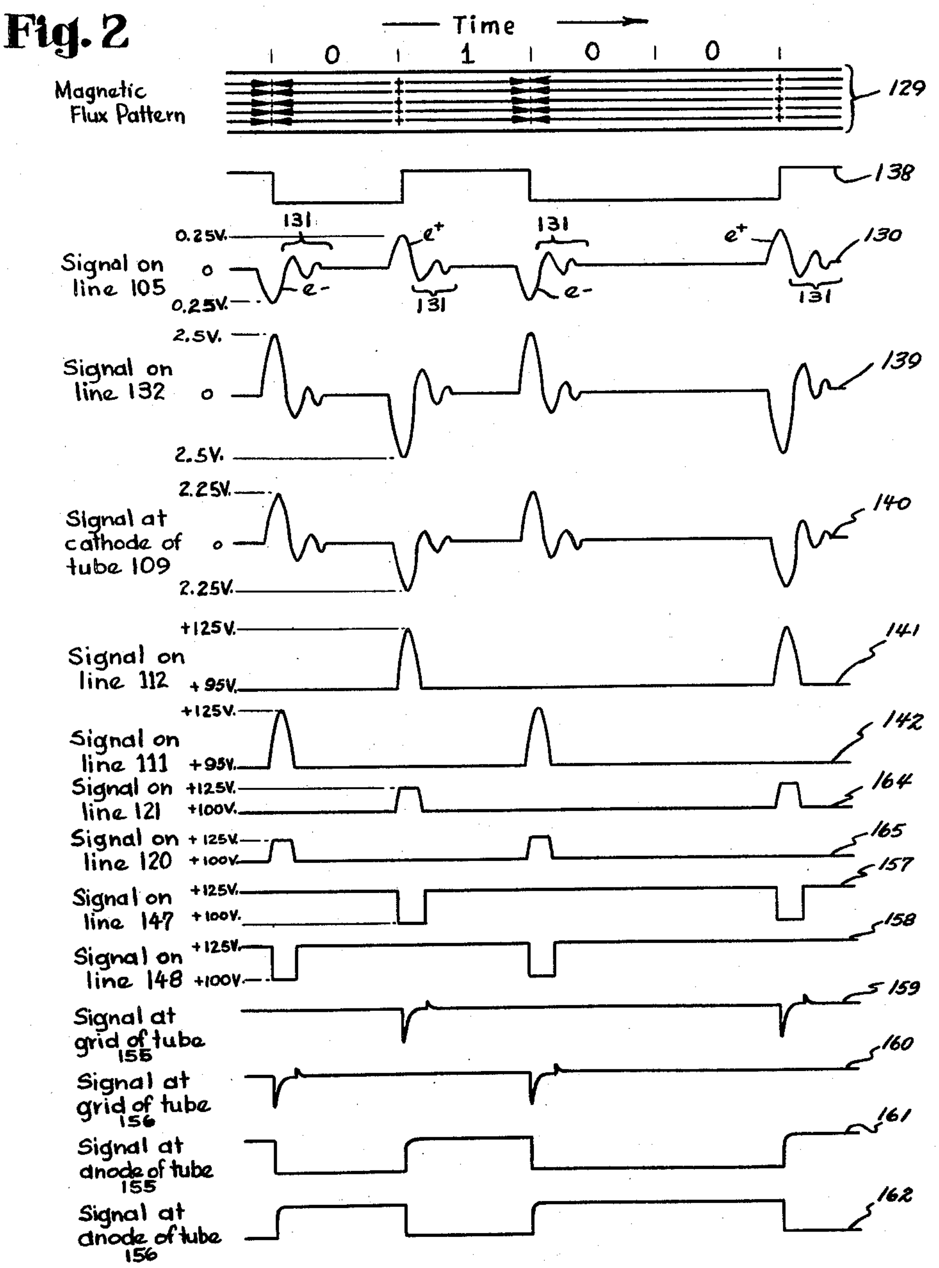
Fig. 2 is a group of waveforms appearing at various points in the circuit of Fig. 1.

In operation, the present invention provides basically for amplification of the signal voltage induced in head 101 prior to channel selection, as will become apparent in the following discussion of the circuit of Fig. 1 and the signal waveforms of Fig. 2.

As drum 100 revolves, the substantially square magnetic saturation pattern 129 of binary digits "one" and "zero" recorded on channel 0, diagrammatically shown as waveform representation 138, induces electrical signal pulses in playback coil 104. These signal pulses are in turn shown represented by the waveform 130 since head 101 causes the induced signal voltage to be such that positive pulses $e^+$ are set up on line 105 corresponding to the leading edges of waveform 138 and negative pulses $e^-$ are set up on line 105 corresponding to the trailing edges of waveform 138. The resultant waveform 130 is characterized by unwanted "overshoot" pulses 131 associated with each pulse $e^+$ and $e^-$. Overshoot pulses 131 result from the well-known "ringing" oscillation of head 101 when a voltage pulse is suddenly induced therein. Since playback coil 104 is loaded down by resistor 108, the oscillatory wave pulses 131 are quickly damped out. The value of resistor 108 is selected as a compromise between signal amplitude and rapidity of damping, as it is desired that the signal strength be maximized but that all oscillations of appreciable magnitude be eliminated prior to the time that the next signal pulse may be received.

The signal is amplified and inverted in tube 106 and appears as waveform 139 on line 132 by which it is directly coupled to the grid of tube 109 where it appears at the cathode in phase but somewhat reduced in amplitude, as shown by waveform 140. Phase inversion by transformer 110, and clamping at a 95 v. level by diodes 113, 114, the secondary winding of transformer 110 and a 95 v. setting of potentiometer 137 produces a waveform 141 including the positive-going pulses $e^+$ on line 112 and a waveform 142 including the positive-going pulses $e^-$ on line 111. It may be noted that amplification in circuitry to this point results in signals with main pulse amplitude on the order of 25 volts. As also shown, the inversion and clamping action at the level of +95 v. as set by adjustment of potentiometer 137 removes the ringing oscillations from waveforms 141 and 142 in the present embodiment. Thus, only those positive-going signal excursions that are of appreciable amplitude and exceed in amplitude the voltage level at the adjustable contact of potentiometer 137, as modified by the action of the clamping diode 114, will appear on lines 111 and 112. It is by this means that extraneous low-level impulses originating as circuit component noise, spurious oscillation in head 101, or otherwise, are eliminated.

Waveforms 141 and 142 are respectively fed as inputs to separate logical "and" circuits 116 and 115, the other input to each such circuit being the channel select function signal from channel select matrix 117, as already noted. "And" circuits 116 and 115 are well known to operate such that, if channel select matrix 117 is arranged for the selection of information in channel 0 to be read, thereby placing the anode-ends of diodes 118 and 119 at a +125 v. potential, pulses $e^+$ and $e^-$ will be passed and will appear on lines 121 and 120, respectively. Further, lines 121 and 120 will be limited to a maximum potential equal to that of the channel select function, i.e., any signal excursions above about +125 v. will be prevented from appearing on these lines. This limiting action may be seen in waveforms 164 and 165. It is thus to be observed that the invention provides for channel selection at an appreciable amplitude of signal, approximately five times the magnitude of any D.C. level variation inherent in channel select matrix 117. It is for this reason that the channel select transient may, in practice, be entirely ignored.

Logical "or" circuits 123 and 122, respectively, are here provided with inputs from "and" circuits 116 and 115 corresponding to all of the heads 101 such that all leading-edge pulses $e^+$ are received by "or" circuit 123 and all trailing-edge pulses $e^-$ are received by "or" circuit 122. Only one of the pairs of signals received by "or" circuits 123 and 122 is high at a time, this pair having been selected by channel select matrix 117. "Or" circuits 123 and 122 function to preclude coaction of the playback circuits. The outputs of these, taken on lines 125 and 124, corresponding to leading-edge pulses $e^+$ for the former and trailing-edge pulses $e^-$ for the latter, are amplified, inverted and clipped to comprise waveforms 157 and 158. These, after differentiation by grid networks of memory flip-flop 154 to comprise waveforms 159 and 160, are employed in triggering the flip-flop into the true state as shown by waveform 161 and the false state as shown by waveform 162, respectively.

It has been noted above that the circuitry of the present invention provides for high signal-level channel gating and thus avoids the aforementioned channel-switching deficiency of other playback circuits known to the art.

It should further be noted that recording transient distortions of playback signals due to paralysis of amplification circuits also is precluded by use of this circuitry since the use of interstage coupling capacitors is avoided until these transients are limited in level.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Circuitry for converting changes of magnetic field polarity at a magnetic transducer head into equivalent changes in logical level of a signal potential as the magnetic field at the head changes in polarity in response to movement therepast of magnetically recorded non-return-to-zero binary signals stored on a movable magnetic record medium, said circuitry comprising: means including an electromagnetic transducer for producing an individual respective damped electric oscillation in response to each polarity change of the adjacent magnetic field, the leading half wave of any such oscillation being of one of the set consisting of positive and negative electrical polarities dependent upon the direction of the polarity-change of the magnetic field; means coupled to said transducer to receive and translate the produced oscillations and having a center-tapped transformer to whose primary the translated oscillations are supplied and having first and second output lines supplied by respective ends of the transformer secondary and having between said output lines and the center tap of the transformer a wave clipping network, said means being effective to provide in response to receipt of a leading half-wave of positive electrical polarity a single electric pulse of a predetermined electrical polarity on a first of said output lines and to provide in response to receipt of a leading half-wave of negative polarity a single electric pulse of said predetermined polarity on the second of said output lines; and means including a flip-flop circuit having two input lines and at least one signal output line and having the said input lines connected respectively to said first and second output lines, whereby the potential of the signal on said signal output line changes between a higher and a lower potential level in response to corresponding polarity changes in said magnetic field, to provide said equivalent changes in logical level of a signal potential.

2. A system for reproducing from the magnetic flux patterns on a desired one of a plurality of magnetic storage channels of a multi-channel movable magnetic record medium, an electrical replica of the original binary electrical signal from which the flux patterns of a channel were produced by magnetic recording, said system comprising: a plurality of magnetic transducer heads, each disposed for cooperation with a respective storage channel of the record medium and each effective to produce electric oscillations the polarity of the leading half-wave of any one of which oscillations is dependent upon the direction of the corresponding flux-pattern change moved past the respective head; a plurality of electric-wave signal-translating means each having a respective input line connected to a respective transducer head to receive the oscillations thereby produced, each said signal-translating means having respective first and second output lines and having a center-tapped transformer to whose primary the translated oscillations are supplied and the ends of the secondary of which are connected to a respective one of the said first and second output lines and also having a wave-clipping network connected between the said first and second output lines and to the center tap of the transformer, each such translating means being effective to produce electric pulses of a single predetermined polarity on its said output lines, the pulses on the first output line being produced in response to reception of a leading half-wave of positive polarity on the input line and the pulses on the second output line being produced in response to reception of a leading half-wave of negative polarity on the input line; a plurality of gating circuits each constructed and arranged to gate signals from a respective output line of a signal-translating means and each connected to pass an electric pulse only when contemporaneously receiving a respective gating signal; means for selectively supplying gating signals to respective ones of said gating circuits; means including logical "or" circuit means having input lines each connected to receive pulses passed by a respective one of said gating circuits, and having first and second output leads, to which received pulses are translated; and a flip-flop circuit having an output terminal and first and second input circuits each connected to a respective one of said output leads and effective in response to pulses translated thereto by said "or" circuit means to vary the potential on the output terminal to produce said electrical replica of the signal from which said flux patterns were produced.

3. A system according to claim 2, in which each of said electric-wave signal-translating means includes a respective signal-transformer means having a primary winding connected to receive respective electric oscillations translated from the respective transducer head, and the transformer means having a center-tapped secondary winding whose opposite terminals are connected across a pair of series-connected oppositely-poled rectifier means whose adjacently-connected similar poles are biased to a potential level above ground potential and are also connected to the center-tap of said secondary winding, and the said opposite terminals of said secondary being connected to respective ones of said first and second output lines, said signal-translating means including bias-means and said rectifier means, whereby the produced output electric pulses provided on said first and second output lines are of the same polarity and are base-clipped at said potential level to eliminate translation of noise-signal potentials on said output lines.

4. Apparatus for conversion of binary signals stored as magnetic polarity-states of respective portions of magnetic material comprised in a movable magnetic record-medium of a digital computer operating at upper and lower logical potential levels, each of opposite binary signals being represented by a respective one of first and second opposite magnetic polarity-states of the magnetic material, the signal conversion being from magnetic polarity-state to equivalent electric binary signals, said apparatus comprising: means including an electromagnetic transducer means constructed and arranged to be positioned closely adjacent a moving magnetic record-medium and effective to produce a damped electric oscillation in response to the change of adjacent magnetic field as contiguous portions of opposite polarity state in such medium are moved therepast, the said electric oscillation having a first half-wave of a first electric polarity if the change in magnetic field is from first to second magnetic polarity but having a first half wave of a second and opposite electric polarity if the change in magnetic field is from second to first magnetic polarity; means including electric wave translating-and-limiting means connected to said transducer means to receive electric oscillations therefrom and having first and second output lines and effective to produce on said first output line only a first single electric pulse only in response to receipt of a damped oscillation having a first half-wave of said first electric polarity and said first single specific electric polarity, and said means being further effective to produce on said second output line only a second single electric pulse only of said specific electric polarity only in response to receipt of a damped oscillation having a first half-wave of said second electric polarity, and all said pulses being produced at a logical potential level above said lower logical potential level; means for providing electric gating-signals at said upper logical potential level and including first and second signal-gating means each operating at said logical potential levels and each connected to receive one of said gating signals and each connected to a respective one only of said first and second output lines to receive a respective one only of said first and second single electric pulses, said gating means each having a respective gate-output line and each providing a respective output signal on only its respective output line only during coincident receipt of the corresponding respective one of said first and second electric pulses and a contemporaneous gating signal; means including an electronic flip-flop circuit, having first and second input lines connected to respective ones of said gate-output lines and having first and second output lines, and said circuit being effective in response to received gate-output signals to produce on one of its output lines electric binary signals corresponding to the binary signals stored in said record-medium as the latter is moved past said transducer means and to produce on the other of its output lines binary signals which are the complement of the electric binary signals produced on the said one of its output lines.

5. Means for producing a series of single-polarity electric signals each representing a respective change in the magnetic-flux pattern of a magnetic record of a series of binary signals as stored in a magnetic record medium, as the record medium is moved past a reading location, said means comprising: means including electromagnetic transducer means constructed and arranged for movement of a magnetic record means therepast and effective in response to such movement to produce a series of electric wave signals each wave signal of which is of electric polarity opposite the next following electric wave signal, said means including a signal output line for the produced electric wave signals; signal-translating means connected to said produced electric wave signals, and including first and second output lines and a center-tapped transformer means whose primary receives the translated electric wave signals and whose secondary end terminals are connected to respective ones of said first and second output lines; and means including biased clamping circuit means inter-connecting respective ones of said first and second output lines to the center tap of said transformer means, whereby the transformed output signals appearing on said first and second output lines are of the same electric polarity and whereby alternate ones of said output signals appear on the first output line and intervening ones of said output signals appear on the second output line and whereby said output signals are base-clipped at a potential determined by said biased clamping circuit means.

6. Means according to claim 5, in which said signal-translating means provides on said first and second output lines respective output signals of amplitude at least as great as an upper logical potential level, and in which the means including the biased clamping circuit means are effective to base-clip the output signals at a lower logical level; and means including means providing selective gating signal pulses at said higher logical potential level, and including signal-gating means arranged to receive said gating signal pulses and said output signals and effective to pass only those output signals which are produced contemporaneously with a gating signal pulse.

7. A circuit for generating electrical signals corresponding to each change of the binary flux pattern recorded on a channel of a rotating drum memory comprising: sensing means positioned adjacent the memory channel to produce a signal having a polarity corresponding to each change of the binary flux pattern; amplifying means for the signals of said sensing means, said amplifying means being direct-coupled to said sensing means; means including a reference potential source means and a transformer connected to said amplifying means for producing, on separate outputs thereof, alternate signals corresponding to respective successive input signals, said outputs being polarized by a steady D.C. potential supplied by said potential source means so that signals appear as unidirectional pulses superimposed upon said D.C. potential; clamping means maintained at a predetermined reference potential by said potential source means so as, effectively, to pass onto the outputs only those portions of the output signals having an amplitude exceeding said reference potential and of the same polarity as the reference potential; and a pair of gating devices each having one input connected to one of said outputs carrying those portions of the signals having an amplitude exceeding said reference potential, the other input of each gating device being connected to the same one output channel of a diode matrix such that whenever the said output channel of the diode matrix is energized, signals appearing at said one input to one of said pair of gating devices are effectively passed to the output thereof.

8. A circuit responsive to signals of either polarity supplied to the input thereof so as to generate output signals of uniform polarity and adapted to discriminate between said output signals so as to pass those portions of the output signals having an amplitude exceeding a predetermined reference potential and to suppress those portions having an amplitude less than said potential, said circuit comprising: potential source means including a source supplying said reference potential; an amplifier for the input signals, a cathode-follower responsive to the output of said amplifier; a transformer having its primary winding in the cathode circuit of said cathode-follower and having a center tapped secondary winding; a potentiometer connected between ground and said source of said predetermined reference potential and having a suitable tap for supplying polarizing D.C. potential to said center tap, and clamping means comprising a pair of rectifiers having their anodes maintained at said predetermined reference potential and having their cathodes connected to the extremities of the secondary winding.

9. Circuitry for converting changes in direction of the magnetic flux pattern on a channel of a moving memory of a computer into electrical pulses comprising: a read head for generating a pulse of positive polarity corresponding to one direction of change in the flux pattern and a pulse of negative polarity corresponding to the opposite direction of change in the flux pattern; an amplifying means directly coupled to said read head for increasing the amplitude of the pulses generated thereby; a transformer responsive to the output of said amplifying means, said transformer provided with a center-tapped secondary winding on the two halves of which inversely related signals are produced corresponding to the input signals; potential source means supplying a predetermined reference potential; a potentiometer connected between ground and said source of predetermined reference potential and having a suitable tap for supplying polarizing D.C. potential to the center tap of said transformer; and clamping means comprising a pair of rectifiers having their anodes connected to said source of predetermined reference potential and having their cathodes connected to the extremities of the two halves of said secondary winding.

References Cited in the file of this patent

UNITED STATES PATENTS

| | | |
|---|---|---|
| 2,609,143 | Stibitz | Sept. 2, 1952 |
| 2,680,239 | Daniels et al. | June 1, 1954 |
| 2,700,149 | Stone | Jan. 18, 1955 |
| 2,771,595 | Hendrickson et al. | Nov. 20, 1956 |
| 2,813,261 | Scully et al. | Nov. 12, 1957 |